United States Patent [19]
von Flotow et al.

[11] Patent Number: 5,924,532
[45] Date of Patent: Jul. 20, 1999

[54] TEMPERATURE COMPENSATED PASSIVE VIBRATION ABSORBER

[75] Inventors: Andreas H. von Flotow; Corydon Roeseler, both of Hood River, Oreg.

[73] Assignee: Applied Power, Inc., Bulter, Wis.

[21] Appl. No.: 08/878,635

[22] Filed: Jun. 19, 1997

[51] Int. Cl.⁶ ....................................................... F16F 7/10
[52] U.S. Cl. ........................................ 188/379; 244/17.27
[58] Field of Search ................................... 188/378, 379; 267/293, 136, 137; 244/119, 17.27, 129.1

[56] References Cited

U.S. PATENT DOCUMENTS

| | | | |
|---|---|---|---|
| 3,487,888 | 1/1970 | Adams et al. | 181/207 |
| 3,490,556 | 1/1970 | Bennett, Jr. et al. | 181/207 |
| 4,140,028 | 2/1979 | Desjardins | 74/574 |
| 4,463,560 | 8/1984 | Greenleaf et al. | 60/527 |

Primary Examiner—Robert J. Oberleitner
Assistant Examiner—Melanie Talavera
Attorney, Agent, or Firm—Quarles & Brady LLP

[57] ABSTRACT

An apparatus for absorbing vibrations in a structural member, such as in an aircraft fuselage, has a mounting member for attaching to the structural member. Two masses are coupled in a cantilevered manner to the mounting member by a plurality of flexible rigid members, such as rods or plates, which act as a spring that allows the masses to vibrate with respect to the mounting member. The spring-mass assembly has a resonant frequency that matches the frequency of the vibrations in the structural member. A mechanism, connected between the two masses, exerts a variable force on the plurality of rigid members to compensate for changes in their stiffness due to changes in temperature and thereby maintain the resonant frequency substantially constant. Preferably the mechanism includes a bimetallic element that has a shape which changes with temperature variation to produce the variable force.

18 Claims, 4 Drawing Sheets

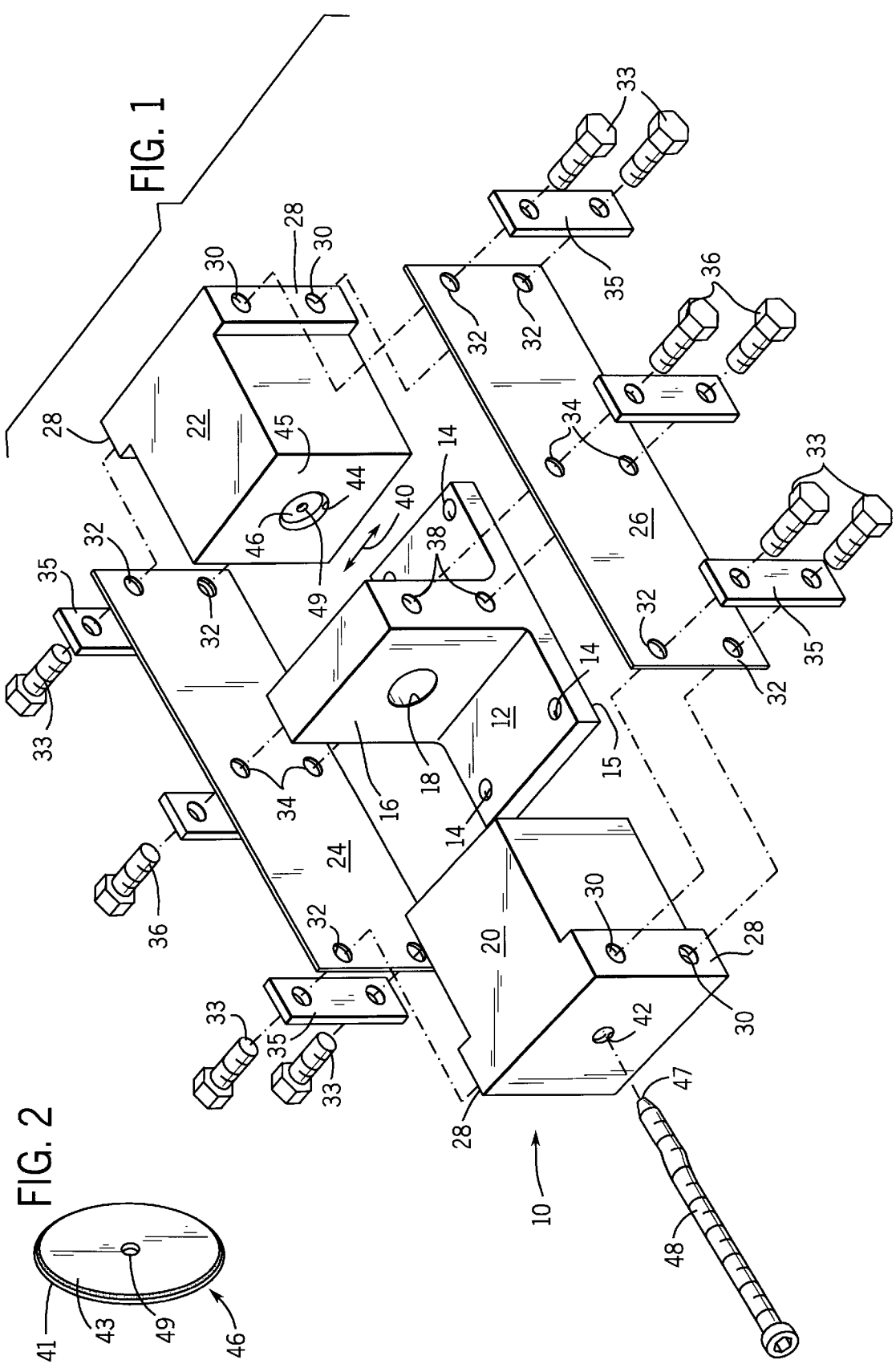

TEMPERATURE COMPENSATED PASSIVE VIBRATION ABSORBER

BACKGROUND OF THE INVENTION

The present invention relates to devices for reducing vibration in structural members, such as those of an aircraft fuselage.

Aircraft engines can induce significant vibration into the fuselage. In propeller powered planes, the propeller blades produce air pressure pulses which strike external surfaces thereby causing a time periodic vibration of the structure, at about 100 Hz for example, which vibration is transferred to other structural members of the airframe. Jet engines also produce vibration in supporting members. If left unchecked, the induced vibrations create objectionable noise in the aircraft cabin, and may result in serious fatigue of the airframe.

As a consequence, vibration absorbers are attached to structural members throughout the aircraft. For example, the Fokker 50 turbo-prop airplane carries approximately 150 frame-mounted absorbers. These devices typically are a simple spring-mass system in which a mass is attached to the airframe by a resilient member that acts as a spring. Elastomeric pads and metal cantilevers have been employed as the spring. The spring-mass system is fixedly tuned to resonate at the common frequency of vibration in the structural member of the airframe to which the absorber is attached and thus optimally absorbs the vibrational energy at that frequency. The absorber has a large mechanical impedance at resonance which is proportional to the quality factor Q, and the weight of the proof mass. Absorption (mechanical impedance) at other frequencies diminishes as a function of the deviation from the resonant frequency.

It should be recognized that vibration absorbers used in aircraft are exposed to large temperature variations during a typical flight. One drawback is that the tuning of these absorbers, and thus their effectiveness, changes as the spring material modulus varies with changes in temperature.

SUMMARY OF THE INVENTION

An object of the present invention is to provide a tuned system for absorbing time periodic vibrations in structural members, wherein the system includes a mechanism which compensates for effects due to temperature variation and thus maintains the desired tuning.

This objective is fulfilled by a vibration absorber that has a mounting member for attaching to a vibrating body. A spring, couples the mass to the mounting member in a cantilevered manner which allows the mass to vibrate with respect to the mounting member. The mass-spring combination has a resonant frequency which is tuned to match a frequency of the vibration to be absorbed in the body. Thus the mass-spring combination vibrates in a manner that absorbs the vibrational energy from the body.

A mechanism is coupled to the mass for compensating for changes in stiffness of the spring due to variation in temperature. In the exemplary embodiment, this mechanism comprises a bimetallic element that exerts a temperature dependent force on the rigid member in a manner that counteracts the changes in spring-stiffness with temperature. Thus as the temperature of the vibration absorber changes, the force provided by the bimetallic element also changes to maintain the resonant frequency of the absorber substantially constant. Steady-state temperature variations, as well as rapid temperature transients, are compensated.

BRIEF DESCRIPTION OF THE DRAWINGS

FIG. 1 is an exploded, isometric view of a passive, tuned vibration absorber according to the present invention;

FIG. 2 is a cross sectional view through a washer-shaped, bimetallic element of the vibration absorber;

DETAILED DESCRIPTION OF THE INVENTION

Figure 4:
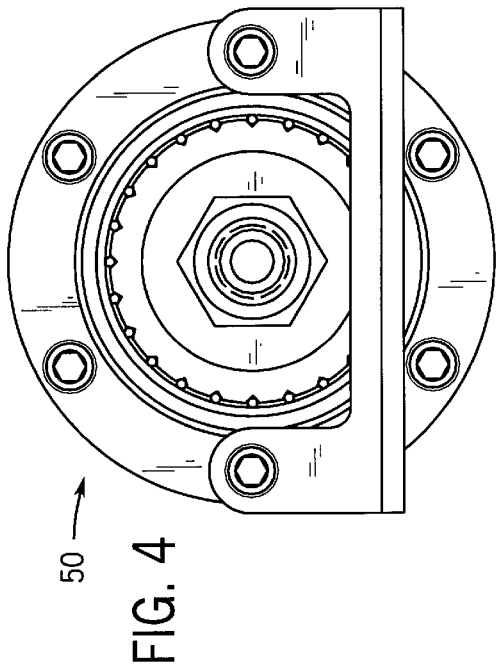
FIG. 4 is an end view of the second embodiment.

With initial reference to FIG. 1, a vibration absorber 10 has an inverted T-shaped mounting bracket 12 with holes 14 for receiving hardware to attach the absorber to a structural member, such as an aircraft fuselage, carrying the undesirable vibrations. The portion 16 of the mounting bracket 12, that is perpendicular to the mounting surface 15, has a relatively large diameter aperture 18 therethrough. Located on opposite sides of the mounting bracket 12 are a pair of proof-masses 20 and 22.

The proof-masses 20 and 22 are coupled to the mounting bracket 12 in a cantilevered fashion by two parallel flexible plates 24 and 26, of metal for example. Specifically, each proof-mass 20 and 22 has a separate raised boss 28 on opposite sides at an end of the respective proof-mass that is remote from the mounting bracket 12. The raised bosses 28 provide clearance for movement of the proof-mass with respect to the mounting bracket 12, as will be described. A pair of threaded holes 30 is formed in each raised boss 28 and align with a pair of apertures 32 near the ends of the flexible plates 24 and 26. Bolts 33 pass through apertures in a fastening bar 35, the apertures 32 in one of the flexible plates 24 and 26, and thread into the proof-mass holes 30 to secure the flexible plates to the proof-masses. Each flexible plate 24 and 26 also has a pair of centrally located apertures 34 which receive additional bolts 36 that fasten into threaded holes 38 in the sides of the mounting bracket 12. As an alternative, holes 30 and 38 may be unthreaded and go entirely through the respective proof-mass or mounting bracket with an fastener passing therethrough. Although each plate 24 and 26 preferably is a single piece, they could be divided into separate half pieces for each proof-mass 20 and 22.

The plates 24 and 26 act as springs, or flexures, which couple the two proof-masses 20 and 22 to the mounting bracket 12 in a flexible manner. Because the plates lie in parallel planes, the proof-masses 20 and 22 can oscillate transversely along axis 40 with respect to the mounting bracket 12. The vibration absorber 10 is mounted to the airframe so that axis 40 coincides with the axis of vibration to be absorbed from the airframe.

The combination of the mounting bracket 12, flexible plates 24 and 26 and proof-masses 20 and 22 with associated mounting components form a spring and proof-mass assembly which has a resonant frequency that is a function of the mass of each proof-mass 20 and 22, as well as the stiffness of the springs formed by the plates 24 and 26. When the resonant frequency matches the frequency of the structural vibration, optimum absorption of vibration energy occurs. Depending upon the specific application, three vibration absorbers 10 can be mounted along orthogonal axes to provide three dimensional vibration absorption.

To obtain the temperature compensation feature of the present invention, the first proof-mass 20 has a threaded aperture 42 aligned with the center of the aperture 18 in the mounting bracket 12 when the system is at rest. A surface 45 of the second proof-mass 22 which faces mounting bracket 12 has a centrally positioned circular recess 44. A flat, washer shaped bimetallic element 46 is located in the recess 44 with a center hole 49. The outer diameter of the bimetallic element 46 is large as compared to the inner diameter ensuring that its spring stiffness is relatively soft compared to the flexure plates 24 and 26. The bimetallic element 46 has two layers 41 and 43 of material with different coefficients of expansion as illustrated in FIG. 2. The layer 42, which faces toward the other proof mass 20, has a higher coefficient of expansion. As a result, bimetallic element 46 bends into a dome shape with temperature changes, i.e. the bimetallic element 46 forms a convex surface facing the other proof mass 20.

As shown in FIG. 1, a tuning screw 48 is threaded through the aperture 42 in the first proof-mass 20 and passes through the aperture 18 in the mounting bracket 12. Aperture 18 has a sufficiently large diameter that the tuning screw 48 does not contact the mounting bracket 12 as proof-masses 20 and 22 vibrate along axis 40. Tuning screw 48 has a tapered tip 47 which fits into the center hole 49 of the bimetallic element 46. The absorber resonant frequency may be fined tuned by adjusting the tuning screw 48.

For the vibration absorber 10 shown in FIG. 1, the annular bimetallic element 46 is positioned so that the high expansion layer 42 faces outward from the recess 44 in proof-mass 22. As the temperature of the vibration absorber increases during a typical thermal cycle, the modulus of the flexible plates 24 and 26 decreases. However, because the total stiffness of the flexure assembly is the sum of the bending stiffness and stiffness due to tension, a drop in bending stiffness is compensated by an increase in tension stiffness. As the bending stiffness of flexure plates 24 and 26 softens due to temperature, the curving of bi-metalic element 46 increases the pre-load force on the tuning screw and the stiffness due to tension increases. The total flexure stiffness then is substantially constant.

The coupling between the two proof-masses 20 and 22 provided by the tuning screw 48 and the bimetallic element 46, introduces a secondary stiffness mechanism which stiffens with increased temperature as the primary springs (flexible plates 24 and 26) soften. The force exerted by bimetallic element 46 is proportional to its temperature and substantially matches the nearly linear change in stiffness of the flexible plates 24 and 26 with temperature. Thus, the change in force exerted by the secondary stiffness mechanism counteracts changes in stiffness of the plates 24 and 26 with temperature variation, so that the resonant frequency of the spring-mass system remains substantially constant, i.e. the tuning does not change with temperature.

Figure 3:
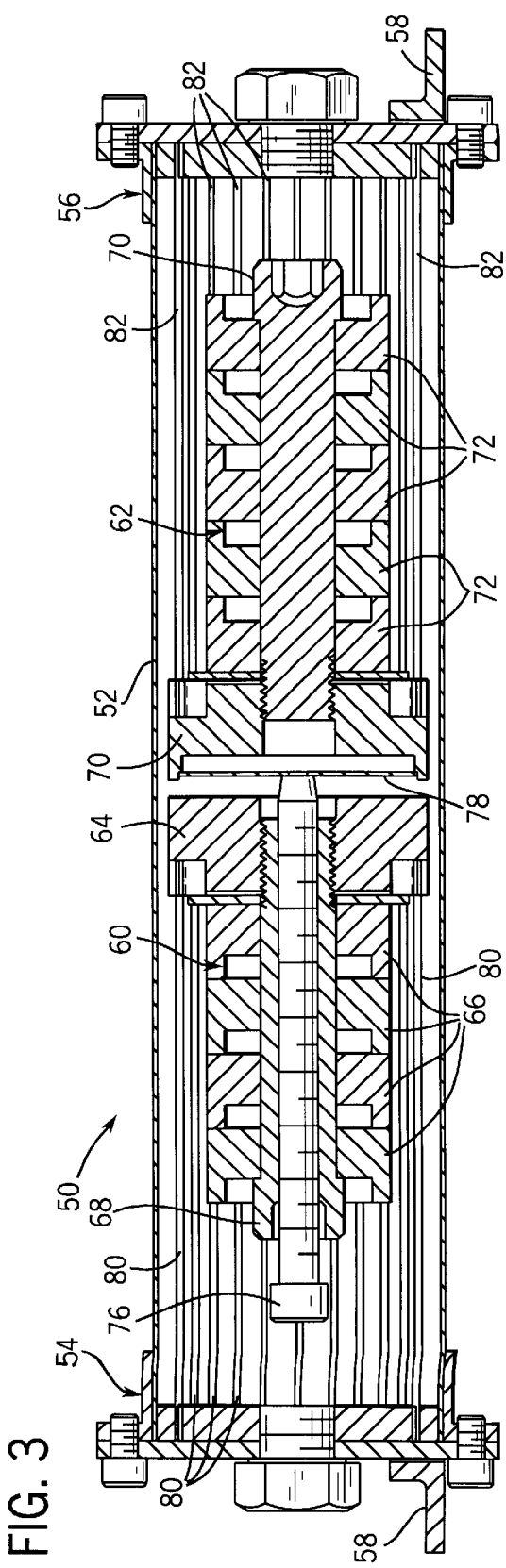
FIG. 3 is a longitudinal cross sectional view through a second embodiment of a vibration absorber according to the present invention.

FIGS. 3 and 4 illustrate another embodiment of a temperature compensated vibration absorber which responds to vibrations occurring in two orthogonal axes perpendicular to a longitudinal axis of the absorber. This vibration absorber 50 has a tubular outer frame 52 with round caps 54 and 56 at the ends. L-shaped mounting brackets 58 are fixed to the end caps 54 and 56 to attach the vibration absorber to the structural member carrying the undesirable vibrations.

The outer frame 52 houses two proof masses 60 and 62. The first proof mass 60 comprises a coupling member 64 to which a plurality of weights 66 are fastened by a bolt 68. The second proof mass 62 comprises a coupling member 70 to which a plurality of weights 72 are fastened by a bolt 74. A circular array of 24 flexure rods 80 extends between the coupling member 64 and the adjacent end cap 54 with the ends of the flexure rods received in blind apertures. Another set of 24 flexure rods 82 extends in a circular array between the other coupling member 67 and end cap 56.

The bolt 68, which holds first proof mass 60 together, has a threaded central aperture with an tuning screw 76 extending therethrough. The tip of the tuning screw 76 projects toward the second proof mass 62 and engages a flat washer shaped, bi-metallic element 78 that extends across a recess in the coupling member 70. The high expansion side of bi-metallic element 78 faces away from the tuning screw 76. The gap is between the two proof-masses is maintained relatively small in order to keep them in phase during oscillation. The tuning screw 76 can be manually adjusted to applied a specific compressive pre-load force to the bi-metallic element 78. That force is reacted through the flexure rods 80 and 82 into the end caps 54 and 46, and back through the tubular outer frame 52.

As the temperature of the vibration absorber 50 increases, the spring modulus of the flexures decreases, thereby softening the bending stiffness of the flexure rods 80 and 82. That temperature change also causes the bimetallic element 78 to bend into a slight dome shape, altering the force exerted on the rods 80 and 82 to counteract temperature induced change in the stiffness of the rods. Thus the resonant frequency of the spring-mass combination is maintained relatively constant through the normal range of operating temperatures of the vibration absorber.

Figure 5:
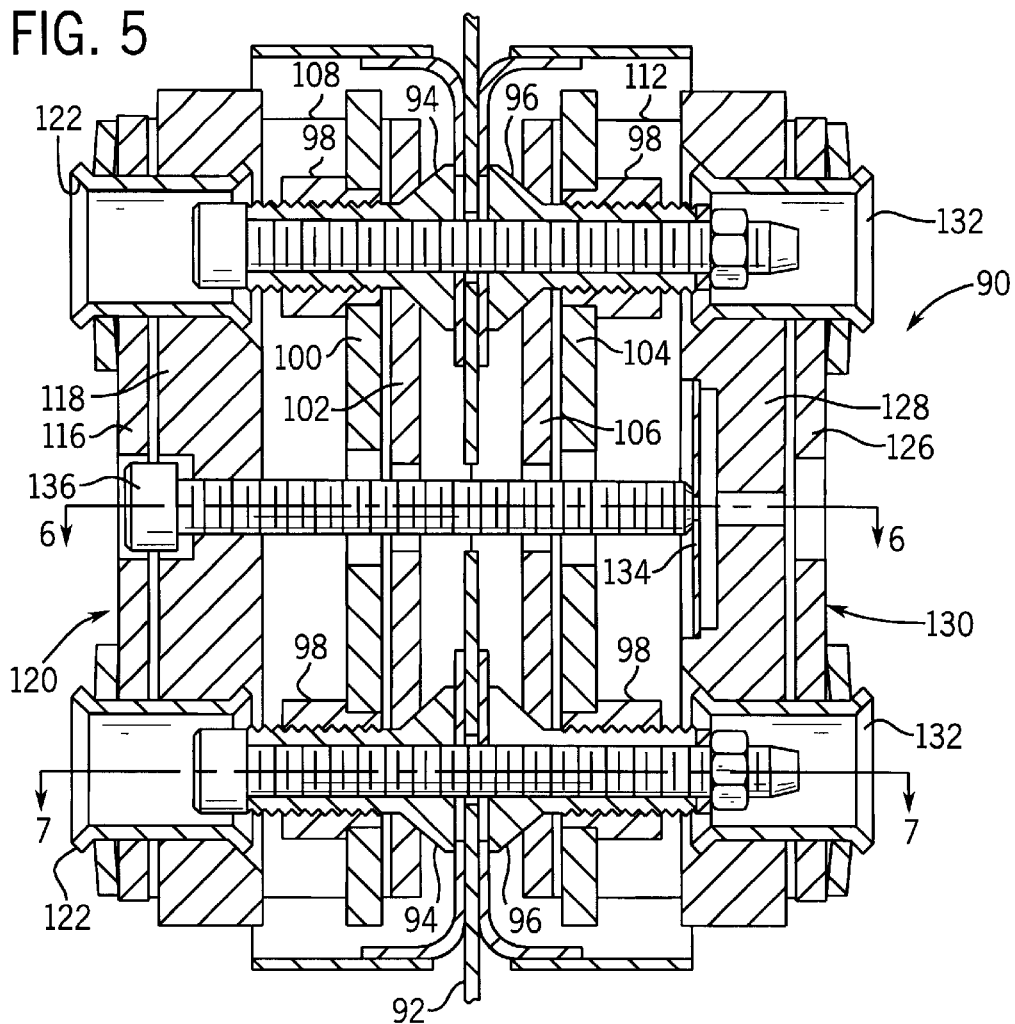
FIG. 5 is a cross sectional view through a third embodiment of a vibration absorber.

FIG. 5 shows a vibration absorber 90 adapted for single axis vibration commonly found in an aircraft fuselage walls near a turning turboprop blade. A device to absorb that vibration should have a proof mass as close as possible to the wall to prevent unwanted flexure twisting. Such compactness is achieved by flexures with bent ends.

Specifically, this vibration absorber 90 is attached at two holes through the airframe 92. A pair of standoffs 94 and 96 are bolted on opposite sides of each of those airframe holes. Each standoff 94 and 96 has external threads that are engaged by nuts 98 which hold a first pair of fastening plates 100 and 102 on one side of the airframe 92 and a second pair of fastening plates 104 and 106 on the other side of the airframe.

Figure 6:
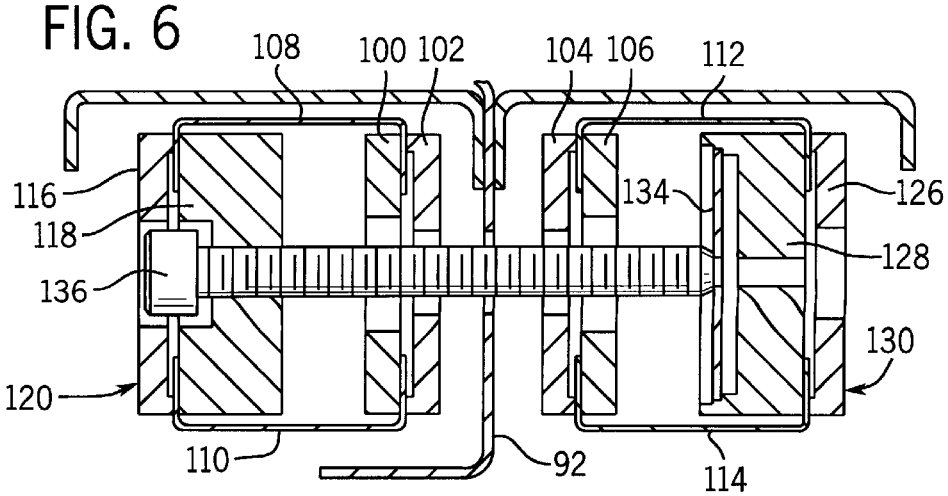
FIG. 6 is a cross sectional view along line 6—6 of FIG. 5.
Figure 7:
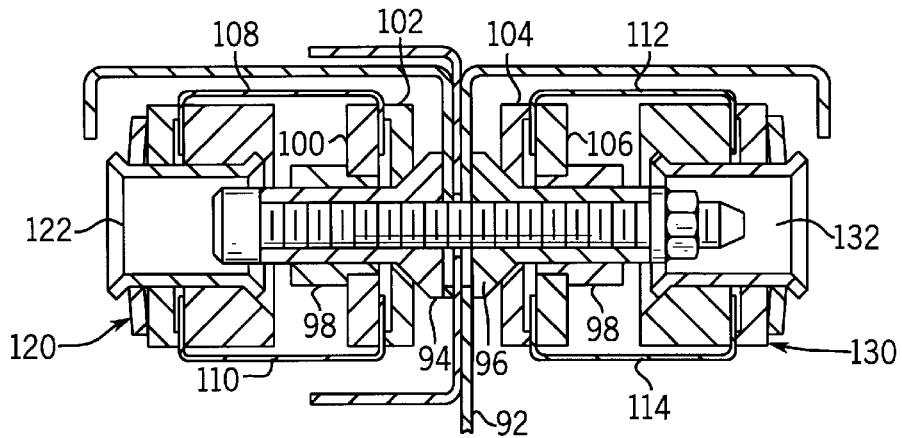
FIG. 7 is a cross sectional view along line 7—7 of FIG. 5.

With additional reference to FIGS. 6 and 7, two flexures 108 and 110 have a bent end that is sandwiched between the first pair of fastening plates 100 and 102. The opposite ends of flexures 108 and 110 also are bent and are sandwiched between two sections 116 and 118 of a first proof-mass 120 which are held together by rivets 122. A second pair of flexures 112 and 114 have bent ends similarly sandwiched between the second pair of fastening plates 104 and 106. The opposite ends of flexures 112 and 114 bend between two sections 126 and 128 of a second proof-mass 130 held together by rivets 132.

Section 128 of the second proof-mass 130 has a recess facing the airframe across which a disk-shaped bimetallic element 134 extends. A tuning screw 136 is threaded through an aperture in the first proof-mass 120 and abuts the bimetallic element 134 to adjust the tension exerted on the flexures 108, 110, 112 and 114.

As in the previous embodiments the bimetallic element 134 changes in curvature with temperature variation to counteract the effect that such temperature variation has on the modulus of elasticity of the flexures 108, 110, 112 and 114. In particular, as the vibration absorber heats up during a typical temperature cycle, the flexures' modulus of elasticity decreases and their bending stiffness is reduced. Meanwhile, the bimetallic element 134 changes to increase the compression load on tuning screw 136. The softening of the flexures due to a lower elasticity modulus is compensated by the stiffening from an increased tension load and net stiffness of the set of flexures 108, 110, 112 and 114 remains substantially constant.

Figure 8:
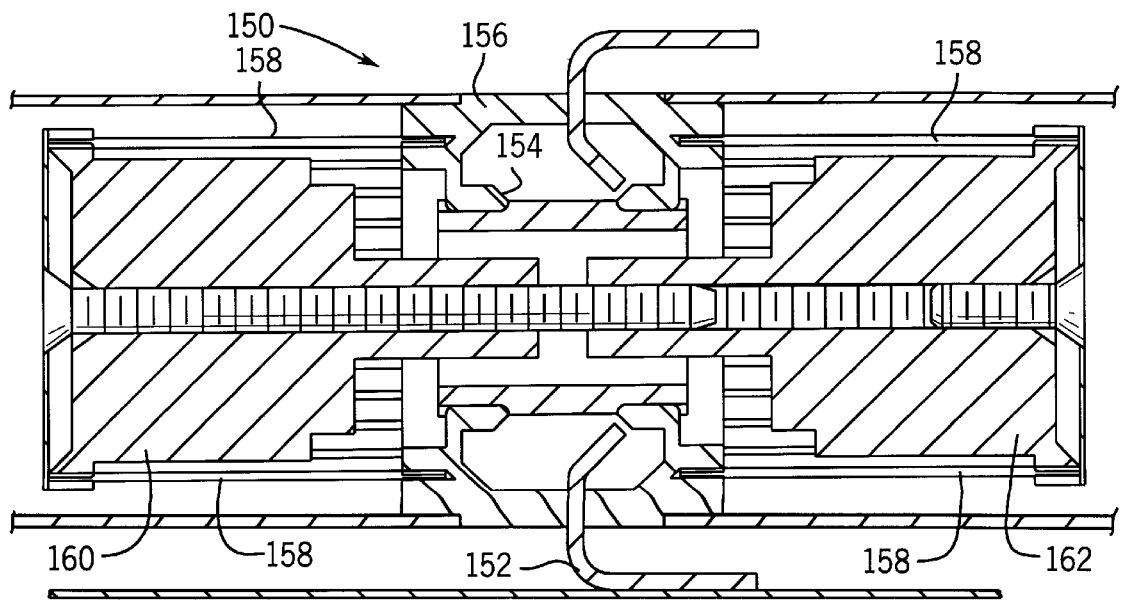
FIG. 8 is a longitudinal cross sectional view through a fourth embodiment of a vibration absorber according to the present invention.

Aircraft manufacturers and operators may be reluctant to drill holes in an airframe in order to mount a vibration absorber. FIG. 8 illustrates a third embodiment of a vibration absorber 150 which mounts through an existing lightening hole of a typical turbo-prop fuselage 152. A tubular, bayonet style, threaded fastener 154 connects a base 156 of the vibration absorber 150 to the aircraft fuselage 152. A plurality of flexure rods 158 project in circles from each side of the base 156 to two separate proof-masses 160 and 162. One proof-mass 160 has an outer recess across which a disk shaped, bimetallic element 166 extends. A tuning screw 164 engages the bimetallic element 166 and the other proof-mass 162, such that tightening the tuning screw draws the two proof-masses together increasing compression of the flexure rods 158.

As with the previous embodiments the curvature of the bimetallic element 166 varies with changes in temperature and exerts a force on the tuning screw 164 which counteracts the change in the modulus of elasticity of the flexure rods that resulted from the temperature change. In this manner the resonant frequency of the vibration absorber in maintained substantially constant.

The foregoing description is directed to the preferred embodiments of the present invention. Although some attention was given to various alternatives within the scope of the invention, it is anticipated that skilled artisans will likely realize additional alternatives that are now apparent from the disclosure of those embodiments. For example, even though the vibration absorber is being described in the context of use in an aircraft, the invention has application in other types of structures that are subjected to vibration. Accordingly, the scope of the invention should be determined from the following claims and not limited by the above disclosure.

I claim:

1. A vibration absorber comprising:
   a mounting member for attaching to a vibrating body;
   a mass;
   a spring comprising a rigid member coupling the mass to the mounting member in a cantilevered manner which allows the mass to vibrate with respect to the mounting member; and
   a mechanism operably coupled to exert a variable force on the rigid member which compensates for changes in a modulus of elasticity of the spring with temperature variation.

2. The vibration absorber as recited in claim 1 wherein the mechanism comprises a bimetallic element.

3. The vibration absorber as recited in claim 1 wherein the rigid member comprises a flexible plate fixed to the mounting member and to the mass.

4. The vibration absorber as recited in claim 3 wherein said mechanism exerts tension on the flexible plate wherein the tension varies with changes in temperature.

5. The vibration absorber as recited in claim 1 wherein the rigid member comprises a rod connected between the mounting member and said mass.

6. The vibration absorber as recited in claim 5 wherein said mechanism exerts compression on the rod wherein the compression varies with changes in temperature.

7. The vibration absorber as recited in claim 1 wherein the rigid member comprises a first flexible plate fixed to one side of the mounting member and to one side of the mass; and further comprising a second flexible plate fixed to an opposite side of the mounting member and to an opposite side of the mass.

8. A vibration absorber comprising:
   a frame for attaching to a vibrating body;
   a first mass;
   a second mass;
   a plurality of rigid members flexibly coupling the first and second masses to the frame in a cantilevered manner which allows the first and second masses to vibrate with respect to the frame; and
   a mechanism connected between the first and second masses member for exerting a variable force on the plurality of rigid members to compensate for changes in stiffness of the plurality of rigid members due to changes in temperature.

9. The vibration absorber as recited in claim 8 wherein the plurality of rigid members comprises a first flexible plate fixed to one side of the mounting member and to one side of each of the first and second masses; and a second flexible plate fixed to an opposite side of the mounting member and to an opposite side of each of the first and second masses.

10. The vibration absorber as recited in claim 8 wherein the plurality of rigid members comprises a plurality of rods with each one being attached to the mounting member and at least one of the first and second masses.

11. The vibration absorber as recited in claim 8 wherein the plurality of rigid members comprises a plurality of rods with each one being attached to the mounting member and both of the first and second masses.

12. The vibration absorber as recited in claim 8 wherein the mechanism comprises a bimetallic element which exerts the variable force on plurality of rigid members.

13. The vibration absorber as recited in claim 8 wherein the mechanism comprises a member coupled to the first mass; and a bimetallic element which couples the member to the second mass wherein the bimetallic element exerts the variable force on the plurality of rigid members.

14. The vibration absorber as recited in claim 13 wherein the variable force exerted by the bimetallic element places the plurality of rigid members in tension.

15. The vibration absorber as recited in claim 13 wherein the variable force exerted by the bimetallic element places the plurality of rigid members in compression.

16. A vibration absorber comprising:
   a tubular frame for attaching to a vibrating body;
   a mass;
   a plurality of flexible members coupling the mass to the tubular frame in a manner which allows the mass to vibrate with respect to the tubular frame; and a mechanism linked to exert a variable force on the plurality of flexible members, which compensates for changes in an modulus of elasticity of the plurality of flexible members due to changes in temperature.

17. The vibration absorber as recited in claim 16 wherein the mechanism comprises a bimetallic element.

18. The vibration absorber as recited in claim 16 wherein the plurality of flexible members comprises a plurality of rods supporting the mass from the frame in a cantilevered manner.

* * * * *